US012373337B2

(12) United States Patent
Du et al.

(10) Patent No.: US 12,373,337 B2
(45) Date of Patent: Jul. 29, 2025

(54) METHOD AND SYSTEM FOR IN-MEMORY METADATA REDUCTION IN CLOUD STORAGE SYSTEM

(71) Applicant: Alibaba Group Holding Limited, Grand Cayman (KY)

(72) Inventors: Yu Du, Hangzhou (CN); Rui Wang, Redmond, WA (US); Peng Xu, Milpitas, CA (US); Yikang Xu, Redmond, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/214,924

(22) Filed: Jun. 27, 2023

(65) Prior Publication Data
US 2023/0342293 A1   Oct. 26, 2023

(51) Int. Cl.
*G06F 12/02* (2006.01)
*G06F 12/0831* (2016.01)
*G06F 13/16* (2006.01)

(52) U.S. Cl.
CPC ...... *G06F 12/0246* (2013.01); *G06F 12/0833* (2013.01); *G06F 13/1668* (2013.01); *G06F 2212/7201* (2013.01)

(58) Field of Classification Search
CPC ............ G06F 12/0246; G06F 12/0223; G06F 12/023; G06F 12/0238; G06F 12/0292;
(Continued)

(56) References Cited

U.S. PATENT DOCUMENTS 9,965,394 B2   5/2018  Romanovskiy
10,102,150 B1  10/2018 Visvanathan et al.
(Continued)

FOREIGN PATENT DOCUMENTS

CN   107066393 A   8/2017
CN   110187999 A   8/2019

OTHER PUBLICATIONS

Yiu, Matt MT, Helen HW Chan, and Patrick PC Lee. "Erasure coding for small objects in in-memory KV storage." Proceedings of the 10th ACM International Systems and Storage Conference. 2017.*

(Continued)

*Primary Examiner* — Tracy A Warren
(74) *Attorney, Agent, or Firm* — Lee & Hayes, P.C.

(57) ABSTRACT

Methods and systems for in-memory metadata reduction in cloud storage system are provided. According to an aspect, a method comprises receiving a first command to write a data stream to a storage device; writing the data stream into a plurality of fragments having logical addresses corresponding to physical addresses on the storage device; and generating an index for individual fragment of the plurality of fragments, the index indicating information to locate the physical addresses of the individual fragment. Individual records in the individual fragment have a same pre-set logical size and all individual records in the individual fragment are continuous, and the index indicates the information including at least: an offset value of the individual record in the individual fragment; the pre-set logical size of the individual record; and a pre-set physical size of the individual record.

20 Claims, 11 Drawing Sheets

(58) Field of Classification Search
CPC ......... G06F 12/0253; G06F 2212/7201; G06F 2212/7207
See application file for complete search history.

(56) References Cited

U.S. PATENT DOCUMENTS

| | | | |
|---|---|---|---|
| 10,558,618 B1 | 2/2020 | Bent et al. | |
| 11,023,318 B1* | 6/2021 | Volkov | G06F 16/1805 |
| 11,036,799 B2 | 6/2021 | Sengupta et al. | |
| 11,256,720 B1 | 2/2022 | Hoffman | |
| 2013/0024460 A1 | 1/2013 | Peterson et al. | |
| 2017/0123714 A1* | 5/2017 | Smith | G06F 3/0619 |
| 2017/0286287 A1* | 10/2017 | Hady | G06F 12/0246 |
| 2017/0300424 A1* | 10/2017 | Beaverson | G06F 16/1752 |
| 2017/0357462 A1* | 12/2017 | Walker | G06F 3/0683 |
| 2020/0364197 A1* | 11/2020 | Larson | G06F 3/064 |
| 2021/0255949 A1* | 8/2021 | Guda | G06F 12/0292 |
| 2022/0342610 A1 | 10/2022 | Nirmale et al. | |

OTHER PUBLICATIONS

International Search Report and Written Opinion for related PCT/CN2020/140152, dated Jul. 13, 2023, 5 pages.

* cited by examiner

400

```
┌─────────────────────────────────────────────────────────────────┐
│ A STORAGE RECORD ENGINE RECEIVES A COMMAND FROM AN END DEVICE   │
│ TO WRITE A DATA STREAM TO A STORAGE DEVICE                      │
│                          402                                    │
└─────────────────────────────────────────────────────────────────┘
                               ↓
┌─────────────────────────────────────────────────────────────────┐
│ THE STORAGE RECORD ENGINE SELECTS AN OPEN SUPERBLOCK AND STARTS │
│ WRITING THE DATA IN THE DATA STREAM SEQUENTIALLY TO THE OPEN    │
│ SUPERBLOCK                                                      │
│                          404                                    │
└─────────────────────────────────────────────────────────────────┘
                               ↓
┌─────────────────────────────────────────────────────────────────┐
│ THE STORAGE RECORD ENGINE WRITES THE DATA STREAM INTO ONE OR    │
│ MORE CHUNKS, EACH COMPRISING MULTIPLE CHUNK SEGMENTS            │
│                          406                                    │
└─────────────────────────────────────────────────────────────────┘
                               ↓
┌─────────────────────────────────────────────────────────────────┐
│ THE STORAGE RECORD ENGINE DETERMINES THAT INDIVIDUAL CHUNK      │
│ SEGMENT HAS A PLURALITY OF DATA RECORDS IN A SAME LOGICAL SIZE  │
│ AND ALL DATA RECORDS IN THE INDIVIDUAL INDEX FRAGMENT ARE       │
│ CONTINUOUS                                                      │
│                          408                                    │
└─────────────────────────────────────────────────────────────────┘
                               ↓
┌─────────────────────────────────────────────────────────────────┐
│ THE STORAGE RECORD ENGINE GENERATES AN INDEX FRAGMENT HEADER    │
│ FOR THE INDIVIDUAL INDEX FRAGMENT TO DEFINE ONE OR MORE         │
│ PARAMETERS ASSOCIATED WITH MAPPING THE LOGICAL ADDRESS OF THE   │
│ DATA RECORD TO THE PHYSICAL ADDRESS                             │
│                          410                                    │
└─────────────────────────────────────────────────────────────────┘
                               ↓
┌─────────────────────────────────────────────────────────────────┐
│ THE STORAGE RECORD ENGINE RECEIVES ANOTHER COMMAND TO READ THE  │
│ DATA RECORD FROM THE STORAGE DEVICE                             │
│                          412                                    │
└─────────────────────────────────────────────────────────────────┘
                               ↓
┌─────────────────────────────────────────────────────────────────┐
│ THE STORAGE RECORD ENGINE TRANSLATES THE LOGICAL ADDRESS OF THE │
│ DATA RECORD TO THE PHYSICAL ADDRESS BASED AT LEAST IN PART ON   │
│ THE ONE OR MORE PARAMETERS AND READS THE DATA RECORD STORED ON  │
│ THE STORAGE DEVICE                                              │
│                          414                                    │
└─────────────────────────────────────────────────────────────────┘
```

```
┌─────────────────────────────────────────────────────────────────────┐
│ A STORAGE RECORD ENGINE RECEIVES A COMMAND FROM AN END DEVICE TO   │
│                WRITE A DATA STREAM TO A STORAGE DEVICE              │
│                                 602                                 │
└─────────────────────────────────────────────────────────────────────┘
                                   ↓
┌─────────────────────────────────────────────────────────────────────┐
│ THE STORAGE RECORD ENGINE SELECTS AN OPEN SUPERBLOCK AND STARTS     │
│  WRITING THE DATA IN THE DATA STREAM SEQUENTIALLY TO THE OPEN       │
│                              SUPERBLOCK                              │
│                                 604                                 │
└─────────────────────────────────────────────────────────────────────┘
                                   ↓
┌─────────────────────────────────────────────────────────────────────┐
│ THE STORAGE RECORD ENGINE WRITES THE DATA STREAM INTO ONE OR MORE   │
│            CHUNKS, EACH COMPRISING MULTIPLE CHUNK SEGMENTS           │
│                                 606                                 │
└─────────────────────────────────────────────────────────────────────┘
                                   ↓
┌─────────────────────────────────────────────────────────────────────┐
│ THE STORAGE RECORD ENGINE DETERMINES THAT INDIVIDUAL CHUNK SEGMENT   │
│  HAS A PLURALITY OF DATA RECORDS IN A FIXED LOGICAL SIZE AND ALL    │
│  DATA RECORDS IN THE INDIVIDUAL INDEX FRAGMENT ARE CONTINUOUS        │
│            EXCEPT ONE OR MORE INVALID DATA RECORDS  608              │
└─────────────────────────────────────────────────────────────────────┘
                                   ↓
┌─────────────────────────────────────────────────────────────────────┐
│ THE STORAGE RECORD ENGINE GENERATES AN INDEX FRAGMENT HEADER FOR    │
│  THE INDIVIDUAL DATA RECORD TO DEFINE ONE OR MORE PARAMETERS        │
│   ASSOCIATED WITH THE FIXED SIZE AND THE INVALID DATA RECORDS       │
│                                 610                                 │
└─────────────────────────────────────────────────────────────────────┘
                                   ↓
┌─────────────────────────────────────────────────────────────────────┐
│ THE STORAGE RECORD ENGINE RECEIVES ANOTHER COMMAND TO READ THE DATA │
│                       FROM THE STORAGE DEVICE                       │
│                                 612                                 │
└─────────────────────────────────────────────────────────────────────┘
                                   ↓
┌─────────────────────────────────────────────────────────────────────┐
│ THE STORAGE RECORD ENGINE TRANSLATES THE LOGICAL ADDRESS OF THE     │
│ DATA RECORD TO THE PHYSICAL ADDRESS OF THE DATA RECORD BASED AT     │
│ LEAST IN PART ON THE ONE OR MORE PARAMETERS AND READS THE DATA      │
│               STORED ON THE STORAGE DEVICE 614                      │
└─────────────────────────────────────────────────────────────────────┘
```

```
┌─────────────────────────────────────────────────────────────────┐
│ THE STORAGE RECORD ENGINE RECEIVES A COMMAND TO DELETE DATA RECORDS │
│                              616                                │
└─────────────────────────────────────────────────────────────────┘
                                │
                                ▼
┌─────────────────────────────────────────────────────────────────┐
│ THE STORAGE RECORD ENGINE PERFORMS A GARBAGE COLLECTION ON THE STORAGE │
│                             SPACE                               │
│                              618                                │
└─────────────────────────────────────────────────────────────────┘
                                │
                                ▼
┌─────────────────────────────────────────────────────────────────┐
│ THE STORAGE RECORD ENGINE REWRITES THE VALID DATA RECORDS TO A NEW │
│           SUPERBLOCK AND ERASE THE INVALID DATA RECORDS         │
│                              620                                │
└─────────────────────────────────────────────────────────────────┘
                                │
                                ▼
┌─────────────────────────────────────────────────────────────────┐
│ THE STORAGE RECORD ENGINE CONVERTS THE INDEX FRAGMENT HEADER TO DEFINE AT │
│    LEAST ONE PARAMETER ASSOCIATED WITH THE INVALID DATA RECORDS │
│                              622                                │
└─────────────────────────────────────────────────────────────────┘
```

```
┌─────────────────────────────────────────────────────────────────┐
│ A STORAGE RECORD ENGINE RECEIVES A COMMAND FROM AN END DEVICE    │
│                TO WRITE A DATA STREAM TO A STORAGE DEVICE        │
│                                 802                              │
└─────────────────────────────────────────────────────────────────┘
                                  ↓
┌─────────────────────────────────────────────────────────────────┐
│ THE STORAGE RECORD ENGINE SELECTS AN OPEN SUPERBLOCK AND STARTS  │
│   WRITING THE DATA IN THE DATA STREAM SEQUENTIALLY TO THE OPEN   │
│                           SUPERBLOCK                             │
│                              804                                 │
└─────────────────────────────────────────────────────────────────┘
                                  ↓
┌─────────────────────────────────────────────────────────────────┐
│ THE STORAGE RECORD ENGINE WRITES THE DATA STREAM INTO ONE OR MORE│
│           CHUNKS, EACH COMPRISING MULTIPLE CHUNK SEGMENTS        │
│                              806                                 │
└─────────────────────────────────────────────────────────────────┘
                                  ↓
┌─────────────────────────────────────────────────────────────────┐
│ THE STORAGE RECORD ENGINE DETERMINES THAT INDIVIDUAL CHUNK       │
│ SEGMENTS HAS MULTIPLE GROUPS, INDIVIDUAL GROUP HAVING A SAME     │
│ NUMBER OF DATA RECORDS IN A FIXED SIZE AND ALL DATA RECORDS IN   │
│               THE INDIVIDUAL GROUP ARE CONTINUOUS                │
│                              808                                 │
└─────────────────────────────────────────────────────────────────┘
                                  ↓
┌─────────────────────────────────────────────────────────────────┐
│ THE STORAGE RECORD ENGINE GENERATES AN INDEX FRAGMENT HEADER FOR │
│ THE INDIVIDUAL DATA RECORD TO DEFINE ONE OR MORE PARAMETERS      │
│           ASSOCIATED WITH THE FIXED SIZE AND THE MULTIPLE GROUPS │
│                              810                                 │
└─────────────────────────────────────────────────────────────────┘
                                  ↓
┌─────────────────────────────────────────────────────────────────┐
│ THE STORAGE RECORD ENGINE RECEIVES ANOTHER COMMAND TO READ THE   │
│                   DATA FROM THE STORAGE DEVICE                   │
│                              812                                 │
└─────────────────────────────────────────────────────────────────┘
                                  ↓
┌─────────────────────────────────────────────────────────────────┐
│ THE STORAGE RECORD ENGINE TRANSLATES THE LOGICAL ADDRESS OF THE  │
│ DATA RECORD TO THE PHYSICAL ADDRESS BASED AT LEAST IN PART ON THE│
│ ONE OR MORE PARAMETERS AND READS THE DATA STORED ON THE STORAGE  │
│                             DEVICE                               │
│                              814                                 │
└─────────────────────────────────────────────────────────────────┘
```

FIG. 8

METHOD AND SYSTEM FOR IN-MEMORY METADATA REDUCTION IN CLOUD STORAGE SYSTEM

CROSS REFERENCE TO RELATED APPLICATIONS

This application claims priority to and is a continuation of PCT Patent Application No. PCT/CN2020/140152, filed on 28 Dec. 2020 and entitled "METHOD AND SYSTEM FOR IN-MEMORY METADATA REDUCTION IN CLOUD STORAGE SYSTEM," which is incorporated herein by reference in its entirety.

BACKGROUND

Cloud distributed storage service usually serves storage in units of chunks. A cloud storage engine is implemented to manage the chunks persisted on storage devices. Unlike a traditional cloud storage engine, which is designed to only support block storage devices, the cloud storage record engine is optimized to run on append-only storage devices. Cloud storage record engine directly manages chunks as raw data records on storage devices. A chunk is logically split into multiple consecutive chunk segments. A chunk segment covers a continuous range of key space of its contained records, which are stored in one single superblock. For an individual chunk segment, cloud storage record engine maintains a record-level in-memory index (also referred to as Chunk Segment Index Metadata (CSIM)) for all records falling into this chunk segment's key range.

For some workload scenarios, record size is fixed and small (e.g., 4096+64 bytes), CSIM data structure may become very large and consume significant amount of host main memory. For example, an 8-byte CSIM entry (31 bits logical offset, 22 bits sector offset and 11 bits sector size) is needed to represent the mapping between a 4K-size record and its corresponding physical sector location. For an 8 TB device, the total CSIM index memory requirement per drive will be 16 GB. That is, a 192 GB main memory needs to be reserved in a 12-drive storage server configuration to store the CSIM entries. It is desirable to provide a method and a system that can reduce the in-memory CSIM size and efficiently utilize the storage space.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 illustrates an example flowchart 400 for implementing the method for in-memory metadata reduction in cloud storage system in accordance with an implementation of the present disclosure.

FIG. 6A illustrates an example flowchart 600A for implementing the method for in-memory metadata reduction in cloud storage system in accordance with an implementation of the present disclosure.

FIG. 6B illustrates an example flowchart 600B for implementing the method for in-memory metadata reduction in cloud storage system in accordance with an implementation of the present disclosure.

FIG. 8 illustrates an example flowchart 800 for implementing the method for in-memory metadata reduction in cloud storage system in accordance with an implementation of the present disclosure.

DETAILED DESCRIPTION

The application describes multiple and varied implementations for in-memory metadata reduction in a cloud storage system and example frameworks that are suitable for practicing various implementations.

Methods and systems for in-memory metadata reduction in cloud storage system are provided. According to an aspect of the present disclosure, a method for in-memory metadata reduction in cloud storage system comprises receiving a first command to write a data stream to a storage device; writing the data stream into a plurality of fragments having logical addresses corresponding to physical addresses on the storage device; and generating an index for individual fragment of the plurality of fragments, the index indicating information to locate the physical addresses of the individual fragment. The individual records in the individual fragment have a same pre-set logical size and all individual records in the individual fragment are continuous.

According to another aspect of the present disclosure, the index indicates the information including at least: an offset value of the individual record in the individual fragment; the pre-set logical size of the individual record; and a pre-set physical size of the individual record.

According to another aspect of the present disclosure, the method for in-memory metadata reduction in cloud storage system further comprises receiving a third command to delete a portion of individual records from the individual fragment; labeling the portion of individual records as invalid records; and converting the index of the individual fragment to include a parameter associated with the invalid records.

According to yet another aspect of the present disclosure, the index indicates the information including at least: a first offset value of the individual record in the individual fragment; a group record count; the pre-set logical size of the individual record; a pre-set physical size of the individual record; and second offset values associated with individual groups.

Figure 1:
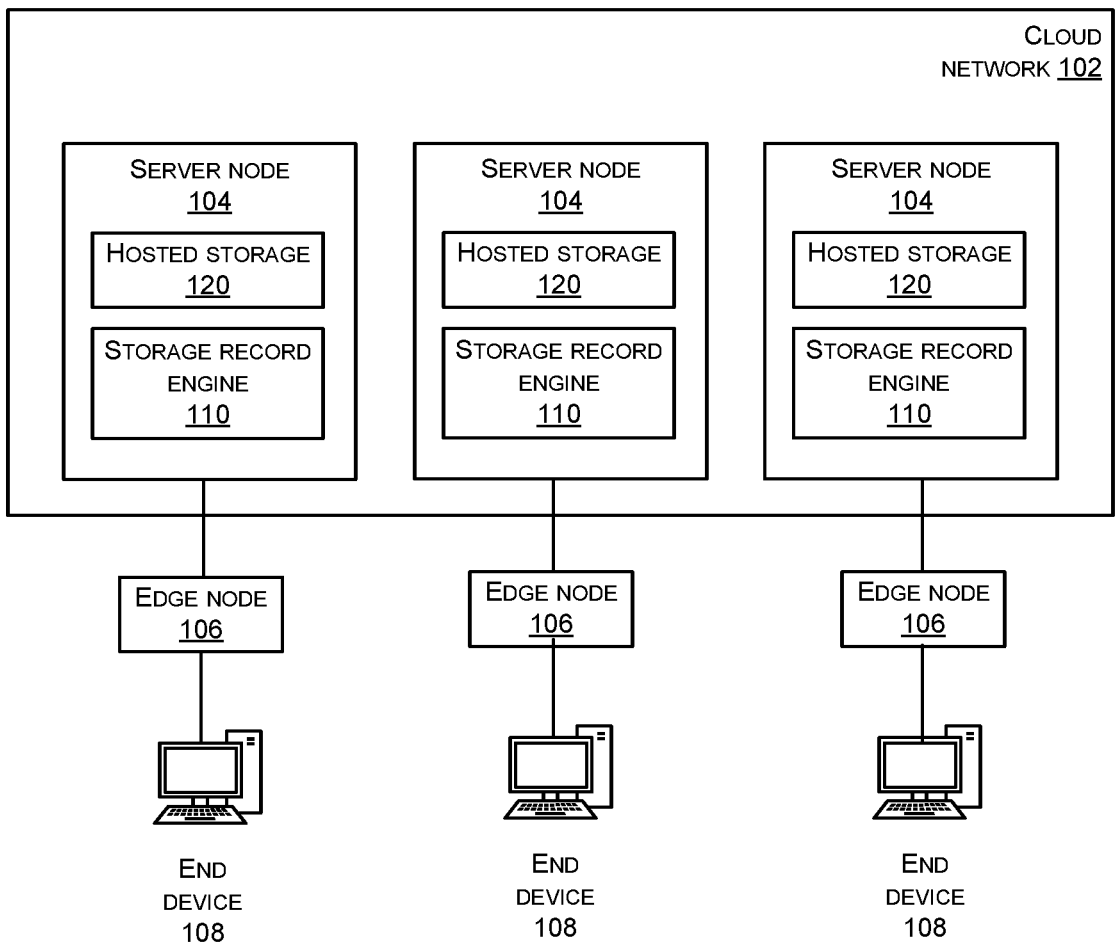
FIG. 1 illustrates an architectural diagram of a storage system 100 according to example embodiments of the present disclosure.

FIG. 1 illustrates an architectural diagram of a storage system 100 according to example embodiments of the present disclosure. The storage system 100 may be a cloud storage system, which may provide collections of servers hosting storage resources to provide distributed storage, improved availability of physical or virtual storage resources, and such benefits.

The storage system 100 may be implemented over a cloud network 102 of physical or virtual server nodes 104(1), 104(2), ..., 104(N) (where any unspecified server node may be referred to as a server node 104) connected by physical or virtual network connections. Furthermore, the network 102 may terminate at physical or virtual edge nodes 106(1), 106(2), ..., 106(N) (where any unspecified edge node may be referred to as an edge node 106) located at physical and/or logical edges of the cloud network 102. The edge nodes 106(1) to 106(N) may connect to any number of end devices 108(1), 108(2), ..., 108(N) (where any unspecified end device may be referred to as an end device 108).

Each of the server node 104 may include a storage record engine, i.e., 110(1), 110(2), . . . , 110(N) (where any unspecified storage record engine may be referred to as a storage record engine 110). The server node 104 may be configured to communicate with any number of end devices 108 by a network connection according to a remote procedure call (RPC) protocol, a file system communication protocol (such as a network file system communication protocol), a data query protocol, and the like, which implements one or more application programming interfaces ("APIs") providing file operation calls. Remote procedure call (RPC) protocol as described herein may implement APIs using interface definition language (IDL) that provides bridges between any number of server nodes 104 and any number of edge nodes 106. File system communication protocols as described herein may implement APIs such as Portable Operating System Interface ("POSIX"), Filesystem in Userspace ("FUSE"), Network File System ("NFS"), Representational State Transfer ("REST") APIs, and the like, suitable for end devices 108 to express a file operation having various parameters. Data query protocols as described herein may implement APIs such as Structured Query Language ("SQL") APIs suitable for end devices 108 to express a database query having various parameters.

In either case, the server node 104 is configured to communicate with any number of end devices 108 by a communication protocol which implements file and/or data operation calls on persistent storage, which include one or more of each type of operation conceptualized as "CRUD" in the art: one or more create operation(s), one or more read operation(s), one or more update operation(s), and one or more delete operation(s), each acting upon files and/or data on persistent storage, without limitation thereto. For brevity, the set of such operation calls implemented by the server node 104 may be referred to as "persistent storage operation calls."

The server node 104 may be further configured to execute persistent storage operation calls by performing file and/or data operations on hosted storage 112. File and/or data operations may include logical file or data operations such as creating files and/or database entries, deleting files and/or database entries, reading from files and/or database entries, writing to files and/or database entries, renaming files and/or database entries, moving a file and/or database entry from one location to another location, and the like. The server node 104 performs all file system and/or database management system functions required to support such operations, may be configured to perform such file operations, and thus does not make any calls to other software layers, such as other file systems or database management systems, storage device drivers, and the like.

Physical and/or virtual storage devices ("hosted storage 120") may be hosted at server nodes 104 of the cloud network 102. Data may be stored as logical blocks of a predetermined size, which may each be individually referred to as a "chunk." Hosted storage 120 may be implemented as physical and/or virtual block storage devices and/or append-only storage devices. Collectively, hosted storage 120 across server nodes 104 of the storage system 100 may be referred to as "cloud storage," and any number of such storage devices may be virtualized as one storage device for the purpose of executing persistent storage operation calls from one or more end devices 108.

Hosted storage 120 may include various forms of computer-readable storage media, which may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

According to example embodiments of the present disclosure, hosted storage 120 may at least include some number of physical and/or virtual storage devices implemented at least in part using flash memory, such as solid-state drives ("SSDs"). However, hosted storage 120 may include any combination of magnetic storage, flash memory, and the like.

The storage record engine 110 may configure hosted storage 120 collectively making up the cloud storage of the storage system 100 to store files and/or database entries, as described above, in some number of basic data structures, which further store metadata describing layout and locations of each stored file and/or database entry. Such metadata may configure a storage record engine 110 to map a logical file and/or data entry, as specified by an end device 108, to each location where data of that logical file and/or data entry is stored across cloud storage on one or more devices of hosted storage 120.

Figure 2:
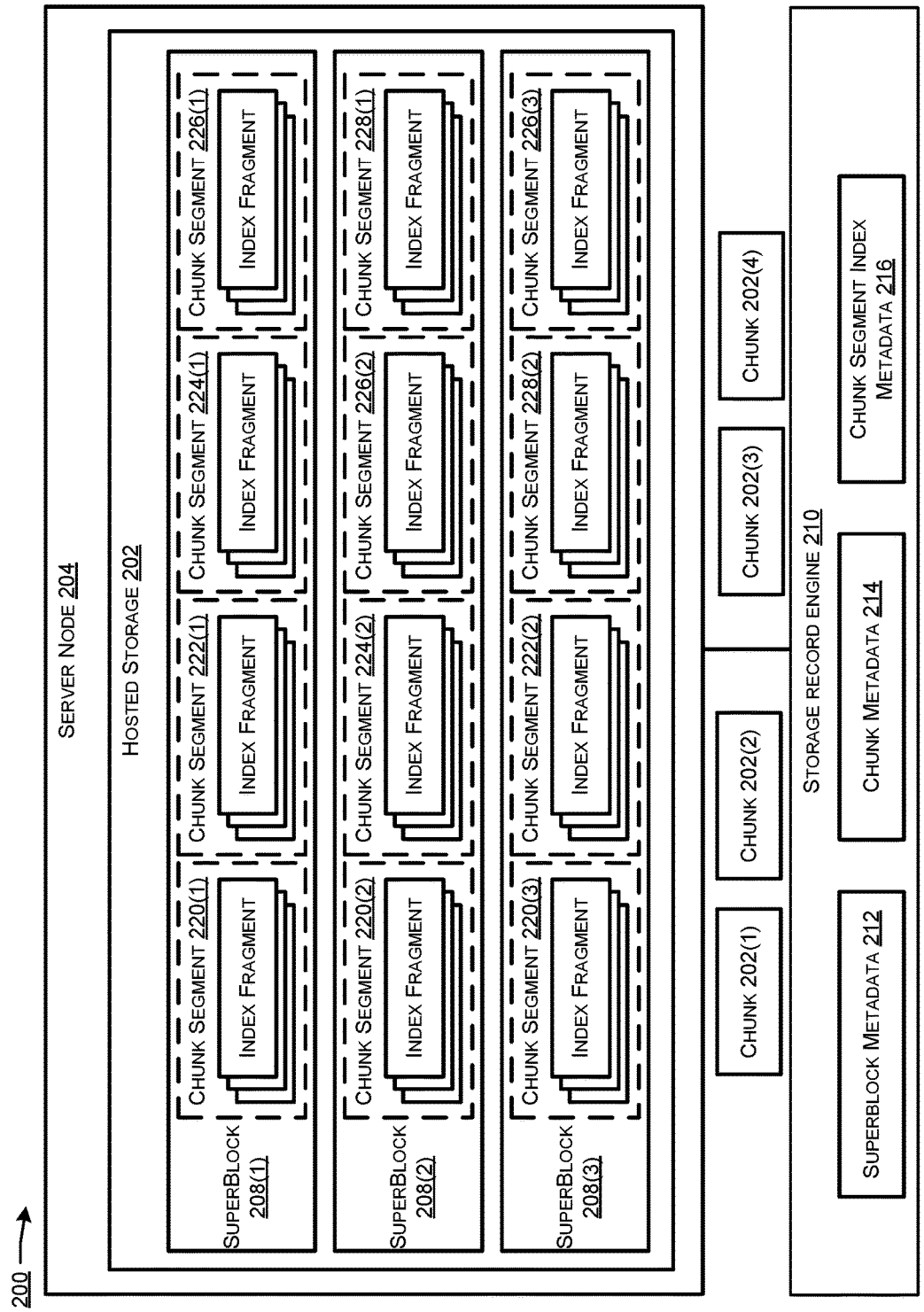
FIG. 2 illustrates an example configuration 200 for implementing the method for in-memory metadata reduction in cloud storage system in accordance with an implementation of the present disclosure.

FIG. 2 illustrates an example configuration 200 for implementing the method for in-memory metadata reduction in cloud storage system in accordance with an implementation of the present disclosure. The example configuration for implementing the method for in-memory metadata reduction in cloud storage system may include a server node 204 and a storage record engine 210.

The server node 204 may host physical and/or virtual storage devices ("hosted storage 202"). The hosted storage 202 may be implemented as an append-only storage device, in which data is sequentially appended to the storage space. The hosted storage 202 may include a plurality of logical storage units referred to as superblocks (e.g., superblocks 208(1), 208(2), and 208(3)). Once a superblock is sealed, no more data can be written to the superblock. Further, once the data is written, a superblock cannot be rewritten unless the data stored thereon is erased by a garbage collection process. The configuration of the server node 204 may be similar to the server node 104 as described in FIG. 1.

The storage record engine 210 communicates with any number of end devices (e.g., end devices 108 shown in FIG. 1) and/or edge nodes (e.g., edge nodes 106 shown in FIG. 1) by a network connection according to a file system communication protocol. The storage record engine 210 may further perform persistent file and/or data operations on the hosted storage 202. Data to be written to the hosted storage 202 can only be appended to a logical storage unit (referred to as a chunk) of the storage record engine 210. Once a chunk is sealed, no more data can be written to a chunk. A chunk may logically include a plurality of consecutive chunk segments. A chunk segment covers a continuous range of key space of the data records stored thereon. In implementations, the storage record engine 210 may perform writing operations for multiple chunks to the superblocks of the hosted storage 202. Individual chunk segments of the multiple chunks may be sequentially written to an open superblock. An open superblock is sealed once the storage space is full. Thus, individual chunk segments of a particular chunk may be split to be stored on multiple superblocks.

As illustrated in FIG. 2, chunk 202(1) includes chunk segment 220(1) stored on superblock 208(1), chunk segment 220(2) stored on superblock 208(2), and chunk segment 220(3) stored on superblock 208(3). Chunk 202(2) includes chunk segment 222(1) stored on superblock 208(1) and chunk segment 222(2) stored on superblock 208(3). Chunk 202(3) includes chunk segment 224(1) stored on superblock 208(1) and chunk segment 224(2) stored on superblock 208(2). Chunk 202(4) includes chunk segment 226(1) stored on superblock 208(1), chunk segment 226(2) stored on superblock 208(2), and chunk segment 226(3) stored on superblock 208(3). Chunk 202(4) includes chunk segment 228(1) stored on superblock 208(2) and chunk segment 228(2) stored on superblock 208(3). It should be appreciated that individual chunk segments belong to multiple chunks may be written to the superblocks in the order they are received. Thus, the examples shown in FIG. 2 are merely for the illustration purpose. A superblock may store more or less chunk segments other that those illustrated in FIG. 2. Further, a hosted storage may include one or more superblocks other that those illustrated in FIG. 2.

The storage record engine 210 may maintain in-memory metadata structures. These in-memory metadata structures may be configured to track the physical locations (i.e., physical sector locations) of data records stored on the disk (i.e., the physical storage device). In implementations, these in-memory metadata structures may include information that can be used to determine the logical locations of the data records stored on the superblocks (i.e., the logical storage device). For example, the in-memory metadata structures may include superblock metadata structure (SMETA) 212 that represents the state of each superblock. The in-memory metadata may further include chunk metadata structure (CMETA) 214 that represents the state of each chunk. The in-memory metadata may further include chunk segment index metadata structure (CSIM) 216 that represents the state of each chunk segment.

According to the examples shown in FIG. 2, the chunk segment index metadata structure (CSIM) 216 may be managed in two dimensions. In one dimension, all chunk segments belong to a same chunk are tracked in a sorted array. For example, an array of chunk segment 220(1), chunk segment 220(2), and chunk segment 220(3) represents chunk 202(1). In another dimension, all chunk segments belong to a same superblock are tracked as a collection. For example, superblock 208(1) is denoted to include a collection of chunk segment 220(1), chunk segment 222(1), chunk segment 224(1), and chunk segment 226(1). The chunk segment index metadata structure (CSIM) 216 is generated to maintain a record-level in-memory index for all data records falling into a chunk segment's key range and may consume a large amount of main memory of the hosted storage 202. The present disclosure provides method and system to reduce the in-memory CSIM size requirement for certain workloads with fixed data record size on the storage record engine 210.

Figure 3:
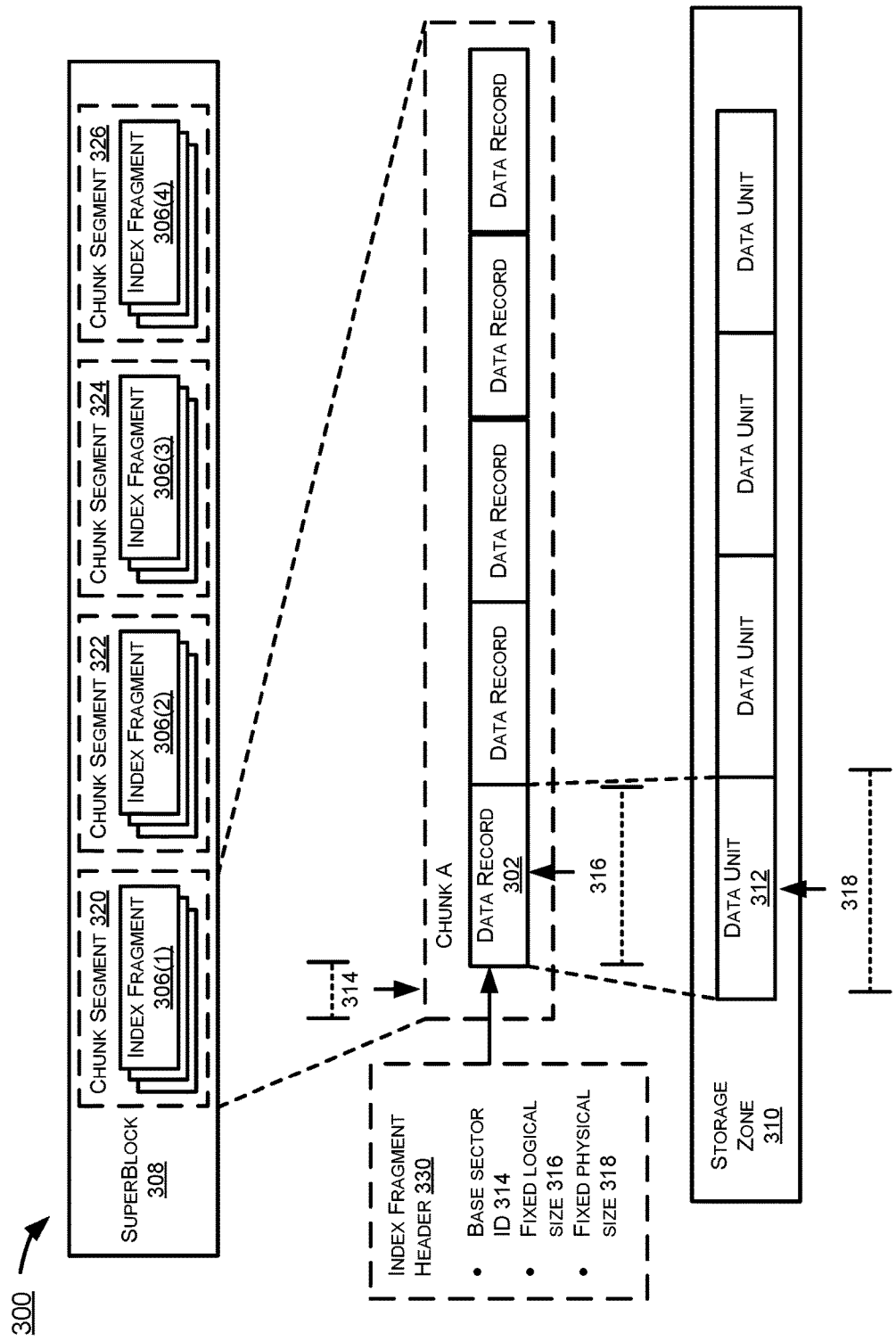
FIG. 3 illustrates an example scenario 300 for implementing the method for in-memory metadata reduction in cloud storage system in accordance with an implementation of the present disclosure.

FIG. 3 illustrates an example scenario 300 for implementing the method for in-memory metadata reduction in cloud storage system in accordance with an implementation of the present disclosure.

According to the example scenario illustrated in FIG. 3, the key spaces in an index fragment are continuous and all data records falling on the key spaces have a same logical size. In implementations, the logical size of the data record may be no less than 4096 bytes. In other implementations, the storage record engine 110 may be configured to support even smaller size data record. The present application is not intended to be limiting. As the key spaces in an index fragment are continuous, all data records written on the physical storage device are also physically contiguous. The count of the continuous data records may be defined as 100. In implementations, the first sector of the data records may be written as 4K-sector aligned.

As illustrated in FIG. 3, chunk segment 320, chunk segment 322, chunk segment 324, and chunk segment 326 are written on superblock 308. Each chunk segment (i.e., chunk segments 320, 322, 324, and 326) has a collection of index data structure (referred to as "index fragment," i.e., index fragments 306(1), 306(2), 306(3), and 306(4)) to represent a collection of contiguous data records to their physical locations. Referring to index fragments 306(1) that represents data record 302, the data record 302 is written to a corresponding physical unit (referred to as "data unit 312") on a storage zone 310 of the physical storage device (i.e., the hosted storage 120 shown in FIG. 1 and/or the hosted storage 202 shown in FIG. 2). In order to read the data record 302 correctly from the physical storage device, the index fragment 306(1) includes an index fragment header located at the beginning of the index fragment 306(1). In implementations, the index fragment header may include a common index fragment header and a formatted index fragment header.

A common index fragment header may include one or more fields that define the information related to the chunk that the data record belongs to and the superblock that the data record is written to. The length of the common index fragment header may be 16 bytes, which may include, but not limited to, one or more of chunk index (24 bits), format type (8 bits), base start offset (32 bits), large record (1 bit), medium record (1 bit), variable logical size (1 bit), superblock ID (24 bits), or record count (16 bits). The chunk index field may indicate the label or index of a chunk. The format type field may indicate information related to the formatted index fragment header. The base start offset field may indicate an offset value of a chunk segment in the superblock the data record is stored thereon. The large record field may indicate whether the size of the data record is large or not, where the value being "1" indicates the size of the data record is large. The medium record field may indicate whether the size of the data record is medium or not, where the value being "1" indicates the size of the data record is medium. The variable logical size field may indicate whether the data records stored on the superblock have variable logical sizes, where the value being "1" indicates the data records stored on the superblock have variable logical sizes. The superblock ID field may indicate an identification of a superblock the data record is stored thereon. The record count field may indicate the count of data records being stored on the superblock.

It should be appreciated that the one or more fields of the common index fragment header described above are merely for the purpose of illustration. The common index fragment header may include one or more other fields to represent the information related to the chunks and/or superblocks. Further, the length of the common index fragment header and the bit allocation to individual fields may vary. The present disclosure is not intended to be limiting.

A formatted index fragment header (i.e., index fragment header 330), according to the example scenario illustrated in FIG. 3, may include, but not limited to, a first parameter indicating an offset value of the data record 302 in chunk A (referred to as "base sensor ID 314"), which the data record 302 belongs to. Index fragment header 330 may further include a second parameter related to a fixed logical size of the data record 302 (referred to as "fixed logical size 316") and a third parameter related to a fixed physical size of the data record 302, i.e., the number of bits that are occupied when written to the physical storage device (referred to as "fixed physical size 316").

The logical address of the data record 302 may be translated to the physical address based at least in part on the parameters defined by the index fragment header 330 of index fragment 306(1) as follows:

$$\text{Record idx}=(\text{chunk logical offset}-\text{base start offset})/\text{fixed logical size} \quad (1)$$

$$\text{Record sector ID}=\text{base sector ID}+(\text{Record idx}*\text{fixed physical size})/4096 \quad (2)$$

$$\text{Record offset}=\text{base sector ID}+(\text{Record idx}*\text{fixed physical size}) \%4096 \quad (3)$$

$$\text{Record sector count}=\text{ROUND\_UP}((\text{fixed physical size}+\text{record offset})/4096) \quad (4)$$

In implementations, the length of the formatted index fragment header may be 12 bytes, which include a 22-bit base sector ID (i.e., the first parameter 314), a 24-bit fixed logical size (i.e., the second parameter 316), and a 24-bit fixed physical size (i.e., the third parameter 318). Similar to the one or more fields of the common index fragment header described above, the formatted index fragment header may also include one or more other parameters to represent the information related to the data record offset in a chunk, the fixed logical size, and the fixed physical size. The length of the formatted index fragment header and the bit allocation to individual parameters may vary. The present disclosure is not intended to be limiting.

FIG. 4 illustrates an example flowchart 400 for implementing the method for in-memory metadata reduction in cloud storage system in accordance with an implementation of the present disclosure.

At block 402, a storage record engine (i.e., storage record engine 110 in FIG. 1) may receive a command from an end device to write a data stream to a storage device. The end device may be any of end devices 108 in FIG. 1 and the storage device may be hosted on any of server nodes 104 in FIG. 1 (i.e., hosted storage 120). The storage record engine may execute persistent storage operation calls by performing data writing and/or file creation on hosted storage 120 of any number of server nodes 104 of cloud network 102.

At block 404, the storage record engine may select an open superblock and start writing data records in the data stream sequentially to the open superblock. In implementations, the storage device may be an append-only storage device and thus, the data is sequentially appended to the open superblock. Once the data is written, the superblock cannot be rewritten unless the data stored thereon is erased. The storage record engine may perform a garbage collection process to free the storage space of the superblock.

At block 406, the storage record engine may write the data stream into one or more chunks, each comprising multiple chunk segments. Individual chunk segment includes a continuous range of key spaces for a plurality of data records, which are stored in one single superblock. Data records are appended to an open chunk. Once the chunk is sealed, no more data can be written to the chunk. During a garbage collection process, a sealed chunk may be deleted and the storage record engine may reclaim the storage space that is occupied by the deleted chunk.

At block 408, the storage record engine may determine that individual chunk segment has a plurality of data records in a same logical size and all data records in the individual chunk segment are continuous. In implementations, the storage record engine may receive the information related to the fixed size data records prior to the storage process. The storage record engine may set the format type field of the common index fragment header to indicate a type of formatted index fragment header to represent the data record to its physical location. In other implementations, the storage record engine may pre-set a type of formatted index fragment header to represent the data record to its physical location. Further, during the data writing process, the storage record engine discovers that the data records are in fixed logical size and all data records are continuous. The storage record engine may convert the current type of formatted index fragment header to a particular format to reduce record-level CSIM size stored thereon. The storage record engine updates information in the fields of the common index fragment header to reflect the conversion of the type of formatted index fragment header.

At block 410, the storage record engine may generate an index fragment header for individual data record to define one or more parameters associated with mapping the logical address of the data record to the physical address. The one or more parameters may be defined in a common index fragment header to indicate information related to the chunk the individual data record belongs to and the superblock the chunk segment is stored thereon. In implementations, the one or more parameters may be defined in a formatted index fragment header to indicate an offset of the individual data record in the chunk and the fixed size of the individual data record (i.e., fixed logical size and fixed physical size).

At block 412, the storage record engine may receive another command to read the data record from the storage device. The command to read the data record may be transmitted from any of end devices 108 in FIG. 1.

At block 414, the storage record engine may translate the logical address of the data record to the physical address of the data record based at least in part on the one or more parameters and read the data record stored on the storage device. The storage record engine may first determine a record index based on logical chunk offset, base start offset, and fixed logical size. Further, based on the record index and offset of the record sector (also referred to as "base sector ID"), the storage record engine may determine a record sector ID and a record offset. The storage record engine may further determine the record sector count and read the data record out starting from the record offset.

Figure 5A:
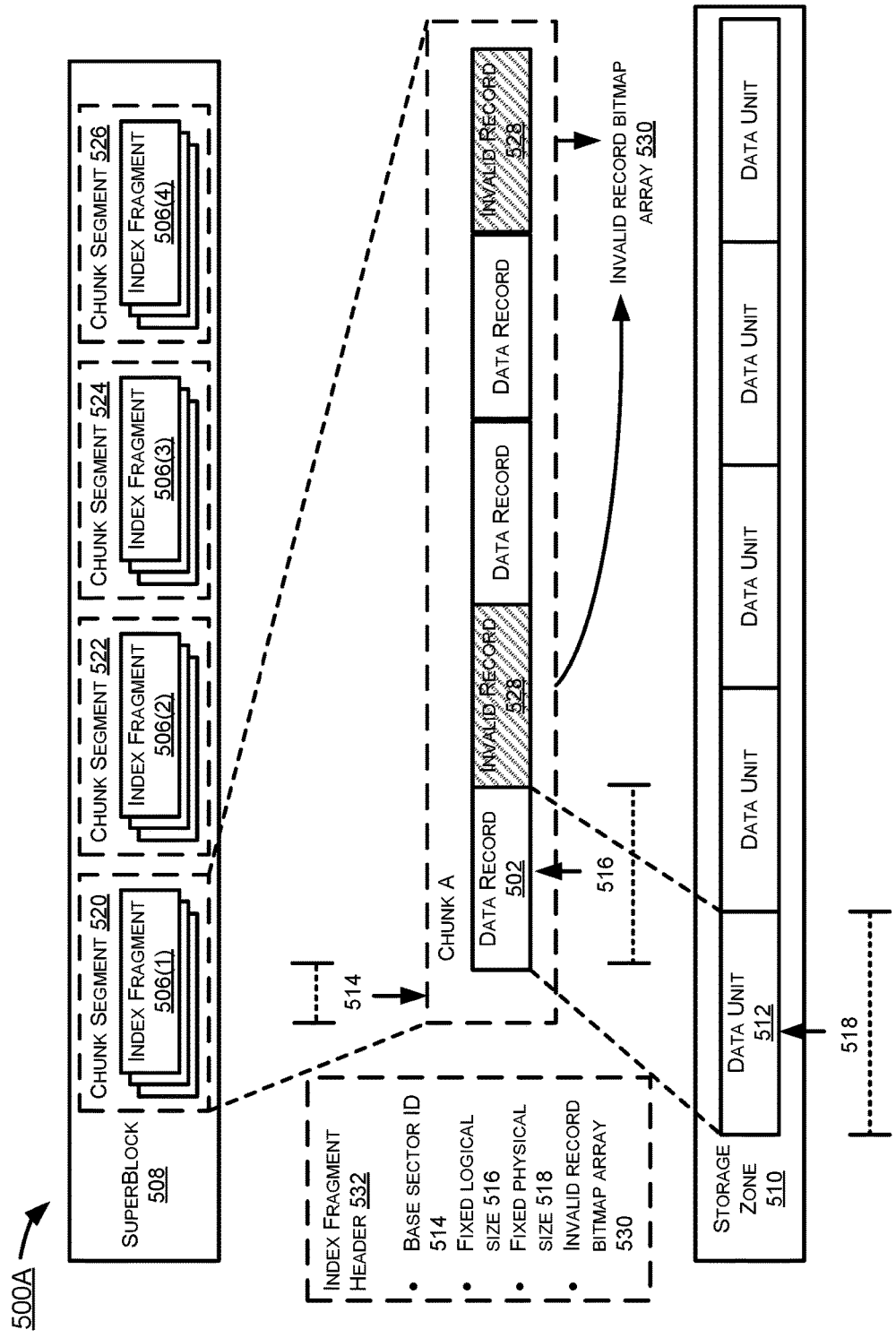
FIG. 5A illustrates an example scenario 500A for implementing the method for in-memory metadata reduction in cloud storage system in accordance with another implementation of the present disclosure.

FIG. 5A illustrates an example scenario 500A for implementing the method for in-memory metadata reduction in cloud storage system in accordance with another implementation of the present disclosure.

The example scenario illustrated in FIG. 5A is similar to the scenario illustrated in FIG. 3 except that the data records in chunk A comprise one or more invalid or deleted records. According to the example scenario illustrated in FIG. 5A, the key spaces in an index fragment are continuous, all data records falling on the key spaces have a same logical size, and all data records except those deleted data records are also physically contiguous. The logical size of the data record may be no less than 4096 bytes. In other implementations, the storage record engine 110 may be configured to support even smaller size data record. The present application is not intended to be limiting. The count of the continuous data records may be defined as 100. In implementations, the first sector of the data records may be written as 4K-sector aligned.

As illustrated in FIG. 5A, chunk segment 520, chunk segment 522, chunk segment 524, and chunk segment 526 are written on superblock 508. Each chunk segment (i.e., chunk segments 520, 522, 524, and 526) has a collection of index fragments (i.e., index fragments 506(1), 506(2), 506 (3), and 506(4)) to represent a collection of contiguous data records to their physical locations. Referring to index fragments 506(1) that represents data record 502, the data record 502 is written to a corresponding physical unit (referred to as "data unit 512") on a storage zone 510 of the physical storage device (i.e., the hosted storage 120 shown in FIG. 1 and/or the hosted storage 202 shown in FIG. 2). The index fragment header representing the data record 502 may also include a common index fragment header and a formatted index fragment header. The common index fragment header may include one or more fields similar to those described above with respect to the example scenario, as illustrated in FIG. 3. As chunk A which the data record 502 belongs to also includes one or more invalid records (i.e., invalid record 528(1) and invalid record 528(2)), the formatted index fragment header 532 of the data record 502 may include additional parameters related to the one or more invalid records so that the storage record engine can read individual data record correctly from their physical locations.

In implementations, the formatted index fragment header 532 may include one or more parameters similar to those described with respect to the formatted index fragment header 332 in FIG. 3. For example, the index fragment header 532 may include a first parameter related to an offset of the data record 502 in chunk A (referred to as "base sector ID 514"), a second parameter related to a fixed logical size of the data record 502 (referred to as "fixed logical size 516") and a third parameter related to a fixed physical size of the data record 502 (referred to as "fixed physical size 518"). The formatted index fragment header 532 may further include an invalid record bitmap 530 related to those invalid/deleted data records stored thereon. The length of individual bitmap entry of the invalid record bitmap 530 may be 8 bytes, which include a 32-bit field indicating accumulated valid count and a 32-bit field of validity bitmap.

The storage record engine may translate the logical address of the data record 502 to the physical address as follows:

$$\text{Record idx} = (\text{chunk logical offset} - \text{base start offset})/\text{fixed logical size} \quad (5)$$

$$\text{Bitmap entry idx} = \text{Record idx}/32 \quad (6)$$

$$\text{Bitmap entry bit offset} = \text{Record idx} \% 32 \quad (7)$$

$$\text{Valid record count} = \text{Bitmap entry's accumulated valid record count} + \text{Bitmap entry's valid bit count (up to bitmap entry bit offset)} \quad (8)$$

$$\text{Record sector ID} = \text{base sector ID} + (\text{Valid record idx} * \text{fixed physical size})/4096 \quad (9)$$

$$\text{Record offset} = \text{base sector ID} + (\text{Valid record idx} * \text{fixed physical size}) \% 4096 \quad (10)$$

$$\text{Record sector count} = \text{ROUND\_UP}((\text{fixed physical size} + \text{record offset})/4096) \quad (11)$$

An index of the data record 502 is computed using equation (5) based on chunk logical offset, base start offset, and fixed logical size. The chunk logical offset may define an offset location of the chunk segment that the data record belongs to in a superblock. The base start offset may define an offset location of a first chunk segment in the superblock. Similar to the example scenario, as illustrated in FIG. 3, such information is defined in the fields of the common index fragment header of the data record 502.

A bitmap address translation is performed using equations (6)-(8). In particular, equation (7) computes a modulo value on individual record index. A modulo value being "1" indicates the data record is a valid record and a modulo value being "0" indicates the data record is deleted and/or invalid. When all deleted and/or invalid records are identified, the storage record engine computes the physical address of the data record using equations (9)-(11). The computations performed by equations (9)-(11) are similar to those performed by equations (3)-(4), except the record index parameter is substituted with the valid record index.

In implementations, the formatted index fragment header according to the present implementation may include a 12-byte fields that defines the base sector ID, the fixed logical size, and the fixed physical size, and one or more 8-byte fields that define individual invalid record bitmap entry. The individual invalid record bitmap entry may further include a 32-bit field that defines an accumulated valid record count and a 32-bit field that defines the validity bitmap. It should be appreciated that the formatted index fragment header according to the example scenario, as illustrated in FIG. 5A, may also include one or more other parameters to represent the information related to the deleted/invalid data records, the data record offset in a chunk, the fixed logical size, and the fixed physical size. The length of the formatted index fragment header and the bit allocation to individual parameters may vary. The present disclosure is not intended to be limiting.

Figure 5B:
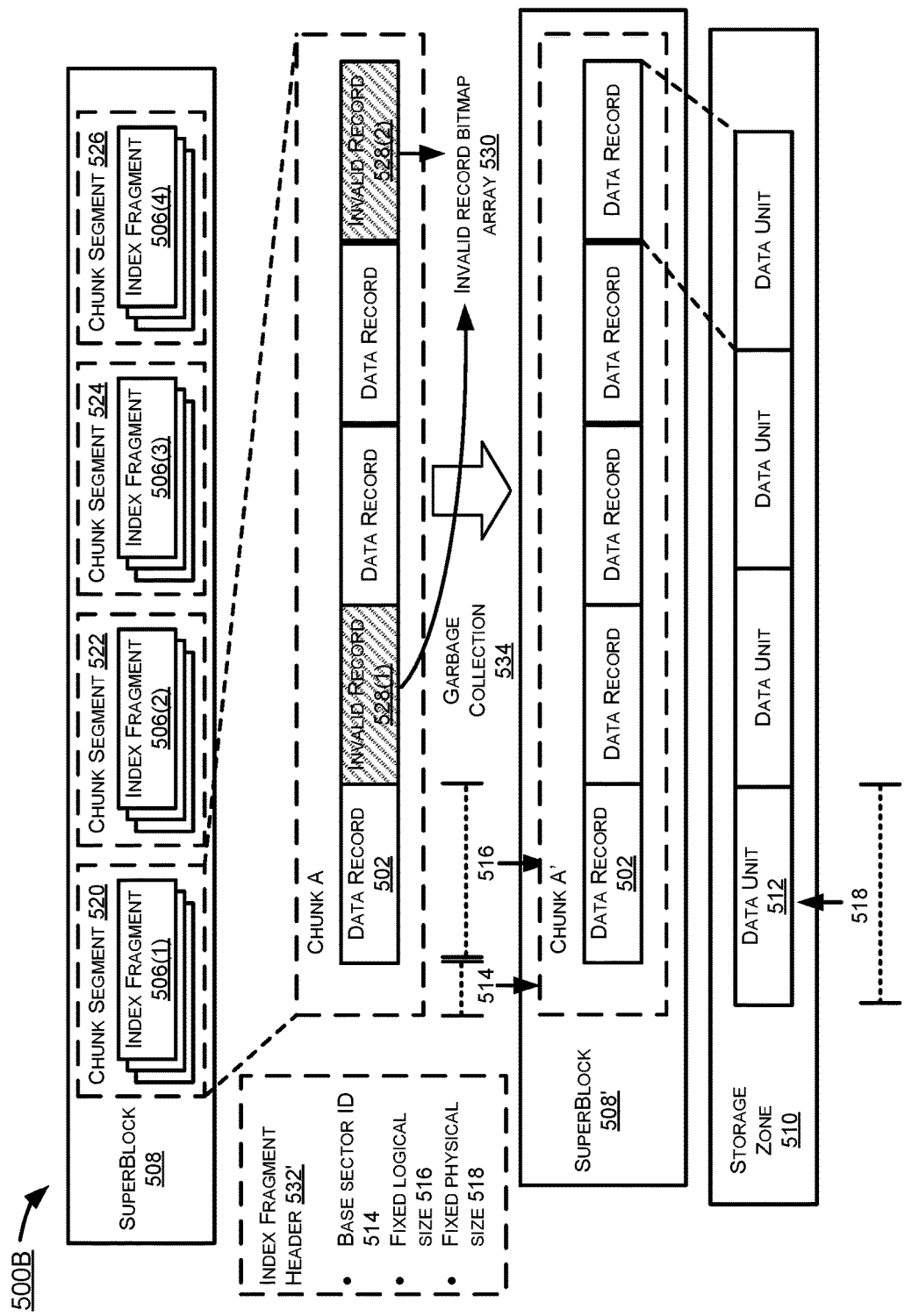
FIG. 5B illustrates an example scenario 500B for implementing the method for in-memory metadata reduction in cloud storage system in accordance with another implementation of the present disclosure.

The storage record engine may perform a garbage collection process when a condition for the garbage collection is triggered. For example, when a portion of the deleted/invalid data records meets and/or exceeds a threshold (i.e., 10% of the total data records stored on a superblock), the garbage collection process may be triggered. Alternatively, or additionally, the garbage collection process may be triggered based on a pre-set time period or user manual input. During a garbage collection process, valid data records are read out from a superblock and compactly rewritten to a new superblock. After all valid data records are copied to the new superblock, the old superblock is erased, which can be used later as a free superblock. Accordingly, as all deleted/invalid data records are permanently deleted, those valid data records that are copied to the new superblock have a same logical size and become physically contiguous. FIG. 5B illustrates an example scenario 500B for implementing the method for in-memory metadata reduction in cloud storage system in accordance with the implementation of the present disclosure.

As illustrated in FIG. 5B, chunk segment 520, chunk segment 522, chunk segment 524, and chunk segment 526 are written on superblock 508 (i.e., the old superblock). Each chunk segment (i.e., chunk segments 520, 522, 524, and 526) has a collection of index fragments (i.e., index fragments 506(1), 506(2), 506(3), and 506(4)) to represent a collection of contiguous data records to their physical locations. Referring to data record 502 as an example, chunk A that data record 502 belongs to also includes one or more invalid record (i.e., invalid records 528(1) and 528(2)). The formatted index fragment header 532' representing the data record 502 before a garbage collection process may include a first parameter related to an offset of the data record 502 in chunk A (referred to as "base sector ID 514"), a second parameter related to a fixed logical size of the data record 502 (referred to as "fixed logical size 516") and a third parameter related to a fixed physical size of the data record 502 (referred to as "fixed physical size 518"). During the garbage collection process 534, the storage record engine 110 may track the data records that are deleted and/or marked to be deleted and determine the offset values of the deleted data records relative to the base sector location. The valid data records are copied a new superblock 508'. The data records newly stored on superblock 508' have the same logical size and become physically contiguous. The formatted index fragment header 532' representing the data record 502 before the garbage collection process 530 may be converted to the formatted index fragment header 532 including invalid record bitmap array 530, as illustrated in FIG. 5A. By converting the formatted index fragment header after the garbage collection, the storage record engine can reclaim the storage space occupied by the deleted data records.

FIG. 6A illustrates an example flowchart 600A for implementing the method for in-memory metadata reduction in cloud storage system in accordance with an implementation of the present disclosure.

At block 602, a storage record engine (i.e., storage record engine 110 in FIG. 1) may receive a command from an end device to write a data stream to a storage device. The end device may be any of end devices 108 in FIG. 1 and the storage device may be hosted on any of server nodes 104 in FIG. 1 (i.e., hosted storage 120).

At block 604, the storage record engine may select an open superblock and start writing data records in the data stream sequentially to the open superblock.

At block 606, the storage record engine may write the data stream into one or more chunks, each comprising multiple chunk segments. Individual chunk segment includes a continuous range of key spaces for a plurality of data records, which are stored in one single superblock.

The operations that the storage record engine perform with respect to blocks 602-606 are similar to blocks 402-406 in FIG. 4, and thus, are not detailed herein.

At block 608, the storage record engine may determine that individual chunk segment has a plurality of data records in a fixed logical size and all data records in the individual chunk segment are continuous except one or more invalid data records. In implementations, the storage record engine may pre-set the format type field of the common index fragment header to indicate a type of formatted index fragment header to represent the data record to its physical location. The pre-set type of formatted index fragment header may be any of the formatted index fragment header. During the data writing process, the storage record engine may discover that the data records are in fixed logical size and all data records are continuous excluding those invalid data records. The storage record engine may convert the current type of formatted index fragment header to a particular format to be more efficiently represent the data records to their physical locations. The storage record engine may update the information in the fields of the common index fragment header to reflex the conversion of the type of formatted index fragment header. By monitoring the data records written to the storage device and dynamically adjusting the formatted index fragment header, the storage record engine can reduce the record-level CSIM size stored thereon and more efficiently use the storage space.

At block 610, the storage record engine may generate an index fragment header for individual data record to define at least one or more parameters associated with the fixed size and the invalid data records. The fixed size may include a parameter of fixed logical size and a parameter of fixed physical size. The index fragment header may also include information related to the invalid data records. In implementations, the information related to the invalid data records may be represented as an array of invalid record bitmap. Individual bitmap entry may be configured to define an accumulated valid record count and a validity bitmap. It should be appreciated that the storage record engine may apply any format to describe the information related to the invalid data records in the index fragment header. The array of invalid record bitmap described above is merely an example for illustration purpose. The present disclosure is not intended to be limiting.

The storage record engine may generate the index fragment header for individual data record to define other parameters related to the chunk the individual data record belongs to and the superblock the chunk segment is stored thereon.

At block 612, the storage record engine may receive another command to read the data record from the storage device.

At block 614, the storage record engine may translate the logical address of the data record to the physical address of the data record based at least in part on the one or more parameters and read the data record stored on the storage device. Comparing to the example scenario, as illustrated in FIG. 3, the storage record engine may need to identify the locations of the invalid data records on the superblock in order to accurately read out the valid data records stored thereon. The storage record engine determines the bit location of individual invalid/deleted data record and the count of valid data records based at least in part on the information defined by the array of invalid record bitmap.

FIG. 6B illustrates an example flowchart 600B for implementing the method for in-memory metadata reduction in cloud storage system in accordance with another implementation of the present disclosure. The example flowchart of FIG. 6B describes the example scenario with a garbage collection, as illustrated in FIG. 5B.

At block 616, the storage record engine may receive a command to delete data records. The command to delete data records may be triggered when a portion of the deleted/invalid data records meets a threshold, e.g., 10% of the total data records. As the data and/or file stored on the virtual and physical storage devices is constantly read, written, edited, or deleted according the user's operation, the accumulated amount of deleted data and/or file may reach a pre-set threshold, thus, triggering a garbage collection process. Alternatively, the command to delete data records may be manually generated by a cloud platform administrator.

At block 618, the storage record engine may perform a garbage collection on the storage space. During the garbage collection process, the storage record engine may track the data records that are marked to be deleted and determine the offset values of those data records relative to the base sector location.

At block 620, the storage record engine may rewrite the valid data records to a new superblock and erase the invalid data records. For an append-only storage device, data can only be appended to a chunk and sequentially written to a superblock. Once written, a superblock cannot be rewritten unless it is erased. The garbage collection process copies only valid data stored on a current superblock to a new superblock and permanently erases all records including those invalid/deleted records stored thereon to release the space for reuse.

At block 622, the storage record engine may convert the index fragment header to define at least one parameter associated with the invalid data records. In implementations, the at least one parameter associated with the invalid data records may include an invalid record bitmap array. Individual bitmap array entry may be in 8-byte length, which includes a 32-bit field indicating accumulated valid count and a 32-bit field of validity bitmap. The information provided by the parameter associated with the invalid data records facilitates reclaiming the storage space occupied by the deleted data records for the purpose of reuse.

Figure 7:
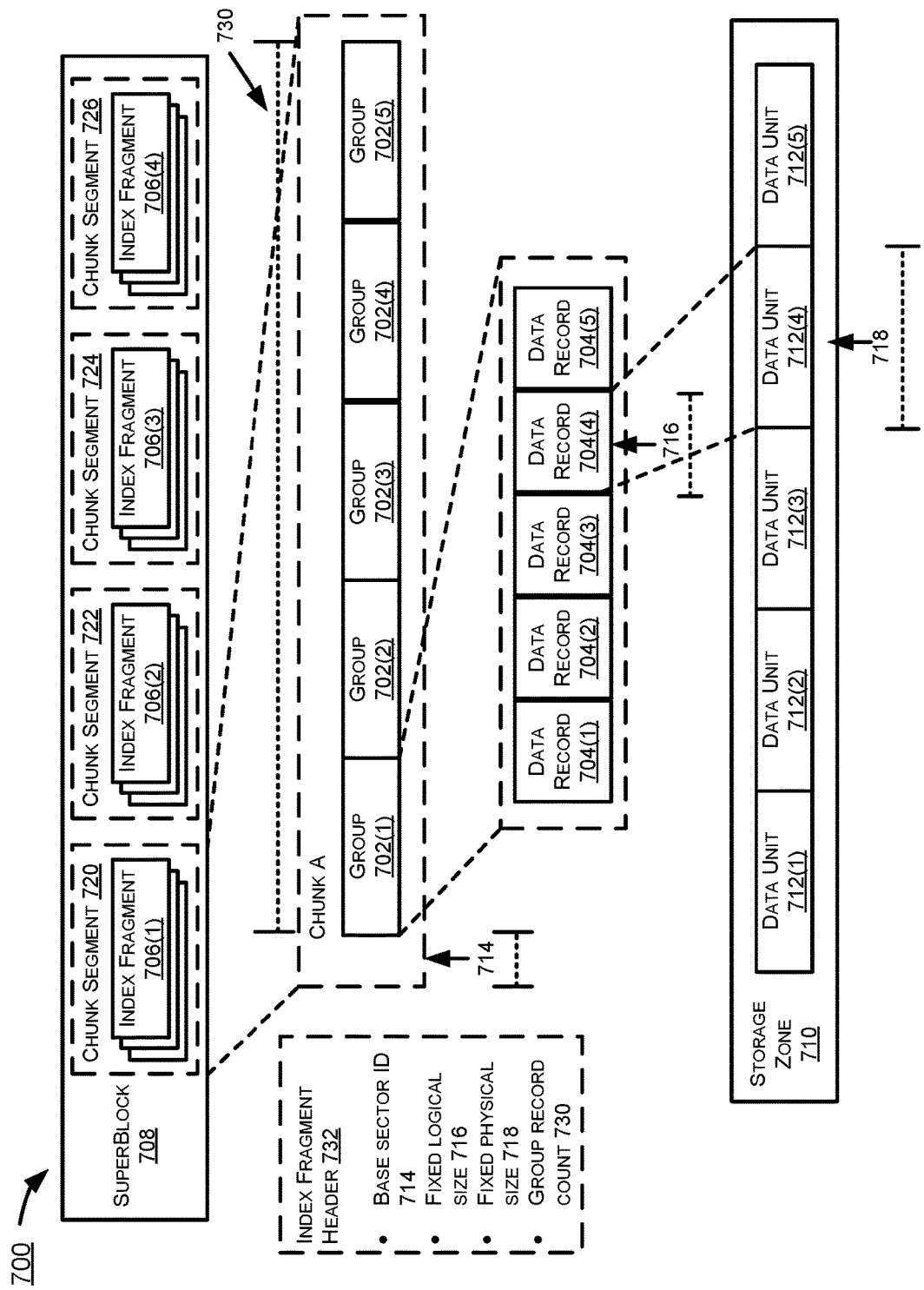
FIG. 7 illustrates an example scenario 700 for implementing the method for in-memory metadata reduction in cloud storage system in accordance with an implementation of the present disclosure.

In implementations, the workloads that arrive at the storage record engine may have fixed size data record and write 10 size. The key spaces in individual index fragment are continuous. The individual index fragment has multiple groups, each group has exactly a same number of data records. Further, for each group, all data records are physically contiguous. The storage record engine may use a particular format for the formatted index fragment header. FIG. 7 illustrates an example scenario 700 for implementing the method for in-memory metadata reduction in cloud storage system in accordance with the implementation of the present disclosure.

As illustrated in FIG. 7, chunk segment 720, chunk segment 722, chunk segment 724, and chunk segment 726 are written on superblock 708. Each chunk segment has a collection of index fragments (i.e., index fragments 706(1), 706(2), 706(3), and 706(4)) to represent a collection of contiguous data records to their physical locations. Referring to index fragment 706(1) as an example, index fragment 706(1) includes a plurality of groups 702(1), 702(2), 702(3), 702(4), and 702(5). Individual group has exactly a same number of data records (i.e., data records 704(1), 704(2), 704(3), 704(4), and 705(5)). The data records are further written to their corresponding physical units (referred to as data units, i.e., 712(1), 712(2), 712(3), 712(4), and 712(5)) on a storage zone 710 of the physical storage device.

Similar to the example scenarios, as illustrated in FIG. 3, FIG. 5A, and FIG. 5B, the index fragment header representing a data record may also include a common index fragment header and a formatted index fragment header. The common index fragment header may include one or more fields similar to those described above, and thus, is not detailed herein. The formatted index fragment header 732 of the data record according to the present implementation may include one or more same parameters, as defined in the formatted index fragment header 330, 532, and 532', for example, the base sector ID 714, the fixed logical size 716, and the fixed physical size 718. The formatted index fragment header 732 of the data record may further include additional parameters related to the group of data records. In implementations, the formatted index fragment header 732 may further include a parameter that defines a group record count (referred to as "group record count 730). Additionally, the storage record engine may generate an index entry array that defines the relative offsets of individual groups to the base sector location. In implementations, the index entry array may be appended to the formatted index fragment header 732.

The storage record engine may translate the logical address of the data record to the physical address as follows:

$$\text{Record idx} = (\text{chunk logical offset} - \text{base start offset}) / \text{fixed logical size} \quad (12)$$

$$\text{Index entry idx} = \text{Record idx} / \text{record count} \quad (13)$$

$$\text{Index entry offset} = \text{Record idx} \% \text{record count} \quad (14)$$

$$\text{Relative sector ID} = \text{lookup index entry's relative sector ID} \quad (15)$$

$$\text{Record sector ID} = (\text{base sector ID} + \text{relative sector ID}) + \text{index entry offset} * \text{fixed physical size} / 4096 \quad (16)$$

$$\text{Record offset} = (\text{base sector ID} + \text{relative sector ID}) + \text{index entry offset} * \text{fixed physical size} \% 4096 \quad (17)$$

$$\text{Record sector count} = \text{ROUND\_UP}((\text{fixed physical size} + \text{record offset}) / 4096) \quad (18)$$

An index of the data record is computed using equation (12) based on chunk logical offset, base start offset, and fixed logical size, similar to equation (1) and 5) described above.

The storage record engine generates the index entry array that defines the relative offsets of individual groups to the base sector location using equations (13)-(15). The storage record engine further determines the physical address of a data record using equations (16)-(18). Comparing to equations (2)-(4) described above with respect to the example scenario of FIG. 3, the storage record engine take the relative sector IDs for multiple groups into account when computing the physical address.

In implementations, the formatted index fragment header according to the present implementation may include 16-byte fields, which are allocated to a 22-bit field that defines the base sector ID, a 24-bit field that defines the group record count, a 24-bit field that defines a fixed logical size, and a 24-bit field that defines a fixed physical size. The index entry array may take 2 bytes allocated to individual group to define the relative sector ID. It should be appreciated that the formatted index fragment header according to the example scenario, as illustrated in FIG. 7, may also include one or more other parameters to represent the information related to the group data records, the data record offset in a chunk, the fixed logical size, and the fixed physical size. The length of the formatted index fragment header and the bit allocation to individual parameters may vary. The index entry array described above is also merely for the illustration purpose. The present disclosure is not intended to be limiting.

In implementations, after a garbage collection process is performed, the index fragment header 732 may be converted to the index fragment header 330 according to the implementation, as illustrated in FIG. 3 to reduce the metadata size and save space required to store the CSIM information.

FIG. 8 illustrates an example flowchart 800 for implementing the method for in-memory metadata reduction in cloud storage system in accordance with an implementation of the present disclosure.

At block 802, a storage record engine (i.e., storage record engine 110 in FIG. 1) may receive a command from an end device to write a data stream to a storage device. Similar to block 402 and 602 described above, the end device may be any of end devices 108 in FIG. 1 and the storage device may be hosted on any of server nodes 104 in FIG. 1 (i.e., hosted storage 120). The storage record engine may execute persistent storage operation calls by performing data writing and/or file creation on hosted storage 120 of any number of server nodes 104 of cloud network 102.

At block 804, the storage record engine may select an open superblock and start writing data records in the data stream sequentially to the open superblock.

At block 806, the storage record engine may write the data stream into one or more chunks, each comprising multiple chunk segments.

At block 808, the storage record engine may determine that individual chunk segment has multiple groups, individual group having a same number of data records in a fixed size and all data records in the individual group being continuous. In implementations, the storage record engine may receive the information related to the groups of data records prior to the storage process. The storage record engine may set the format type field of the common index fragment header to indicate a type of formatted index fragment header to represent the data record to its physical location. In other implementations, the storage record engine may pre-set a type of formatted index fragment header to represent the data record to its physical location. During the data writing process, the storage record engine discovers that individual chunk segment has multiple groups, individual group having a same number of data records in a fixed size and all data records in the individual group being continuous. The storage record engine may convert the current type of formatted index fragment header to a particular format to represent the data records to their physical locations. The storage record engine further updates information in the fields of the common index fragment header to reflex the conversion of the type of formatted index fragment header.

At block 810, the storage record engine may generate an index fragment header for individual data record to define at least one or more parameters associated with the fixed size and the multiple groups. The parameters associated with the fixed size may be defined in a common index fragment header as well as in the formatted index fragment header. The parameters associated with the multiple groups may be defined in the formatted index fragment header. The storage record engine may further determine the relative sector ID of individual groups to the base sector ID based on the one or more parameters.

At block 812, the storage record engine may receive another command to read the data record from the storage device.

At block 814, the storage record engine may translate the logical address of the data record to the physical address of the data record based at least in part on the one or more parameters and read the data record stored on the storage device. For the example scenario, as illustrated in FIG. 7, the storage record engine determines the locations of individual groups by computing the relative sector ID (i.e., relative offset of individual group to the base sector ID). When translating the data record address, the storage record engine computes the address, taking into account the relative offset of individual group.

The methods described in FIG. FIG. 4, FIG. 5A, FIG. 5B, and FIG. 8 are described in the general context of machine-executable instructions. Generally, machine-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Figure 9:
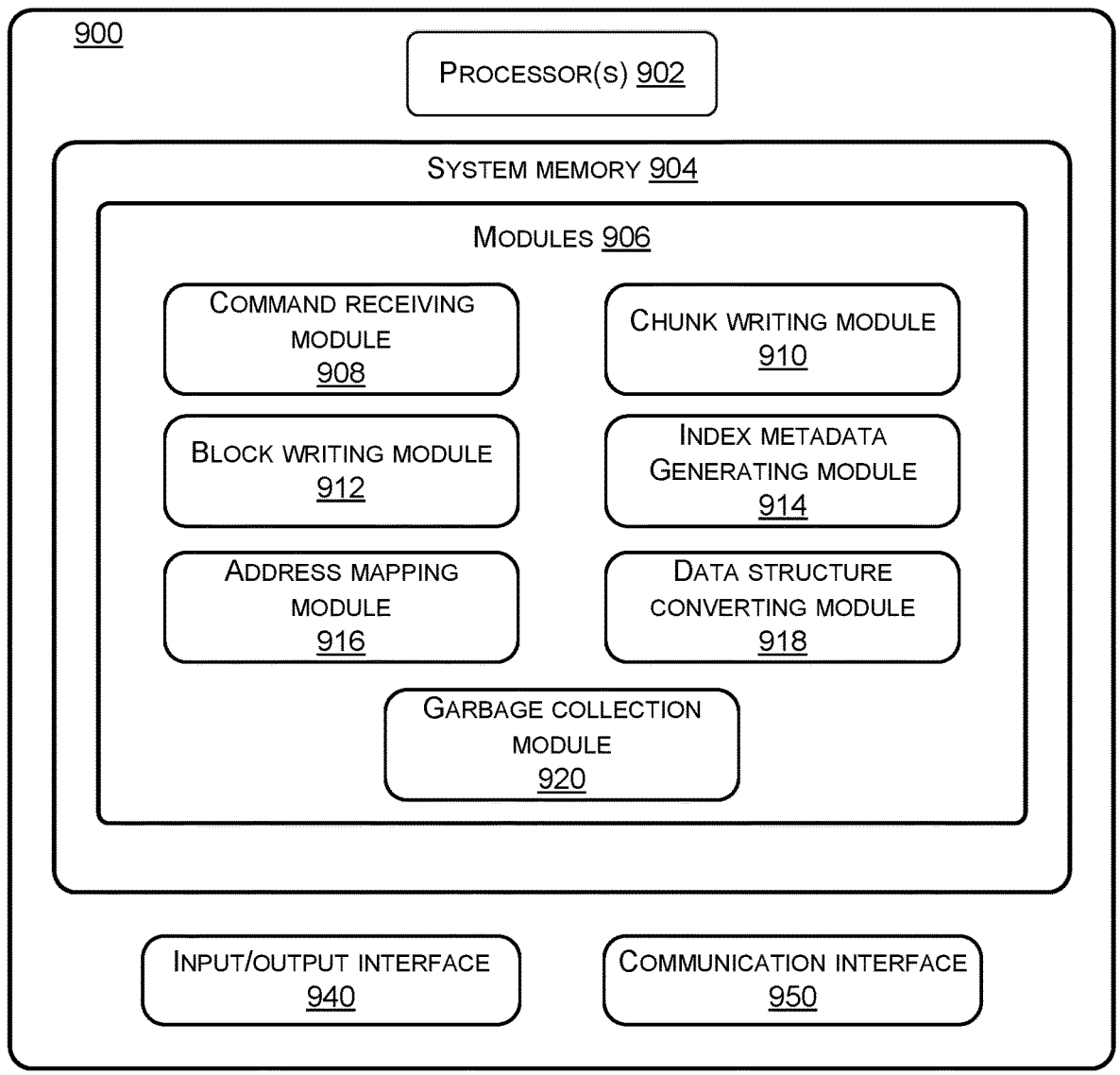
FIG. 9 illustrates an example system 900 for implementing the methods described above for in-memory metadata reduction in cloud storage system.

FIG. 9 illustrates an example system 900 for implementing the methods described above for in-memory metadata reduction in cloud storage system.

The techniques and mechanisms described herein may be implemented by multiple instances of the system 900, as well as by any other computing device, system, and/or environment. The system 900 may be a single computing system or an edge host providing physical or virtual computing resources as known by persons skilled in the art. Examples of the system 900 may include a storage record engine as described above (i.e., the storage record engine 110, as illustrated in FIG. 1). The system 900 shown in FIG. 9 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 900 may include one or more processors 902 and system memory 904 communicatively coupled to the processor(s) 902. The processor(s) 902 and system memory 904 may be physical or may be virtualized and/or distributed. The processor(s) 902 may execute one or more modules and/or processes to cause the processor(s) 902 to perform a variety of functions. In embodiments, the processor(s) 902 may include a central processing unit ("CPU"), a graphics processing unit ("GPU"), both CPU and GPU, or other processing units or components known in the art. Additionally, each of the processor(s) 902 may possess its own local memory, which also may store program modules, program data, and/or one or more operating systems.

Depending on the exact configuration and type of the system 900, the system memory 904 may be volatile, such as RAM, non-volatile, such as ROM, flash memory, miniature hard drive, memory card, and the like, or some combination thereof. The system memory 904 may include one or more computer-executable modules 906 that are executable by the processor(s) 902.

The modules 906 may include, but are not limited to, a command receiving module 908, a chunk writing module 910, a block writing module 912, an index metadata generating module 914, an address mapping module 916, a data structure converting module 918, and a garbage collection module 920. The garbage collection module 920 may be stored on a same system 900 as the rest of the above-mentioned modules or may be stored on a different instance of the system 900.

The command receiving module 908 may be configured to receives a command from an end device to write a data stream to a storage device as described above with reference to FIG. 4, FIG. 5A, FIG. 5B, and FIG. 7.

The chunk writing module 910 may be configured to write data sequentially to a chunk as described above with reference to FIG. 4, FIG. 5A, FIG. 5B, and FIG. 7.

The block writing module 912 may be configured to write the chunk segments sequentially to an open superblock as described above with reference to FIG. 4, FIG. 5A, FIG. 5B, and FIG. 7.

The index metadata generating module 914 may be configured to generate index fragment metadata (i.e., the index fragment header) that represents the data records to their physical locations as described above with reference to FIG. 4, FIG. 5A, FIG. 5B, and FIG. 7.

The address mapping module 916 may be configured to map/translate the logical address of a data record to its physical address as described above with reference to FIG. 4, FIG. 5A, FIG. 5B, and FIG. 7.

The data structure converting module 918 may be configured to convert the data structure (i.e., the format of the index fragment header) to further save storage space as described above with reference to FIG. 4, FIG. 5A, FIG. 5B, and FIG. 7.

The system 900 may additionally include an input/output (I/O) interface 940 and a communication module 950 allowing the system 900 to communicate with other systems and devices over a network, such as the cloud network as described above with reference to FIG. 1. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 4, 5A, 5B, and 7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the above method blocks are described to be executed in a particular order, in some implementations, some or all of the method blocks can be executed in other orders, or in parallel.

In some instances, one or more components may be referred to herein as "configured to," "configurable to," "operable/operative to," "adapted/adaptable," "able to," "conformable/conformed to," etc. Those skilled in the art will recognize that such terms (i.e., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (i.e., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally, or alternatively, some or all of the operations may be implemented by one or more ASICS, FPGAs, or other hardware.

Example Clauses

A. A method comprising: receiving a first command to write a data stream to a storage device; writing the data stream into a plurality of fragments having logical addresses corresponding to physical addresses on the storage device; and generating an index for individual fragment of the plurality of fragments, the index indicating information to locate the physical addresses of the individual fragment.

B. The method as recited in paragraph A, wherein individual records in the individual fragment have a same pre-set logical size and all individual records in the individual fragment are continuous.

C. The method as recited in paragraph B, wherein the index indicates the information including at least: an offset value of the individual record in the individual fragment; the pre-set logical size of the individual record; and a pre-set physical size of the individual record.

D. The method as recited in paragraph C, further comprising: receiving a second command to read the data stream from the storage device; mapping the logical addresses of the plurality of fragments into the physical addresses based at least in part on the offset value of the individual record in the individual fragment, the pre-set logical size of the individual record, and the pre-set physical size of the individual record; and read the data stream from the storage device according to the physical addresses of the plurality of fragments.

E. The method as recited in paragraph C, further comprising: receiving a third command to delete a portion of individual records from the individual fragment; labeling the portion of individual records as invalid records; and converting the index of the individual fragment to include a parameter associated with the invalid records.

F. The method as recited in paragraph E, further comprising: mapping the logical addresses of the plurality of fragments into the physical addresses based at least in part on the offset value of the individual record in the individual fragment, the pre-set logical size of the individual record, the pre-set physical size of the individual record, and the parameter associated with the invalid records.

G. The method as recited in paragraph A, wherein the individual fragment includes a plurality of groups, individual group having a same number of individual records and all individual records in the individual group being continuous.

H. The method as recited in paragraph G, wherein the index indicates the information including at least: a first offset value of the individual record in the individual fragment; a group record count; the pre-set logical size of the individual record; a pre-set physical size of the individual record; and second offset values associated with individual groups.

I. The method as recited in paragraph H, further comprising: mapping the logical addresses of the plurality of fragments into the physical addresses based at least in part on the first offset value of the individual record in the individual fragment, the group record count, the pre-set logical size of the individual record, the pre-set physical size of the individual record, and the second offset values associated with individual groups.

J. A system comprising: one or more processors, and memory communicatively coupled to the one or more processors, the memory storing computer-executable modules executable by the one or more processors that, when executed by the one or more processors, perform actions including: receiving a first command to write a data stream to a storage device; writing the data stream into a plurality of fragments having logical addresses corresponding to physical addresses on the storage device; and generating an index for individual fragment of the plurality of fragments, the index indicating information to locate the physical addresses of the individual fragment.

K. The system as described in paragraph J, wherein individual records in the individual fragment have a same pre-set logical size and all individual records in the individual fragment are continuous, and the index indicates the information including at least: an offset value of the individual record in the individual fragment; the pre-set logical size of the individual record; and a pre-set physical size of the individual record.

L. The system as described in paragraph K, wherein the actions further comprises: receiving a second command to read the data stream from the storage device; mapping the logical addresses of the plurality of fragments into the physical addresses based at least in part on the offset value of the individual record in the individual fragment, the pre-set logical size of the individual record, and the pre-set physical size of the individual record; and read the data stream from the storage device according to the physical addresses of the plurality of fragments.

M. The system as described in paragraph K, wherein the actions further comprises: receiving a third command to delete a portion of individual records from the individual fragment; labeling the portion of individual records as invalid records; and converting the index of the individual fragment to include a parameter associated with the invalid records.

N. The system as described in paragraph M, wherein the actions further comprises: mapping the logical addresses of the plurality of fragments into the physical addresses based at least in part on the offset value of the individual record in the individual fragment, the pre-set logical size of the individual record, the pre-set physical size of the individual record, and the parameter associated with the invalid records.

O. The system as described in paragraph J, wherein the individual fragment includes a plurality of groups, individual group having a same number of individual records and all individual records in the individual group being continuous.

P. The system as described in paragraph O, wherein the index indicates the information including at least: a first offset value of the individual record in the individual fragment; a group record count; the pre-set logical size of the individual record; a pre-set physical size of the individual record; and second offset values associated with individual groups.

Q. A computer-readable storage medium storing computer-readable instructions executable by one or more processors of a video compression system, that when executed by the one or more processors, cause the one or more processors to perform actions comprising: receiving a first command to write a data stream to a storage device; writing the data stream into a plurality of fragments having logical addresses corresponding to physical addresses on the storage device; and generating an index for individual fragment of the plurality of fragments, the index indicating information to locate the physical addresses of the individual fragment.

R. The computer-readable storage medium as described in paragraph Q, wherein individual records in the individual fragment have a same pre-set logical size and all individual records in the individual fragment are continuous, and the index indicates the information including at least: an offset value of the individual record in the individual fragment; the pre-set logical size of the individual record; and a pre-set physical size of the individual record.

S. The computer-readable storage medium as described in paragraph Q, wherein the actions further comprises: receiving a third command to delete a portion of individual records from the individual fragment; labeling the portion of individual records as invalid records; and converting the index of the individual fragment to include a parameter associated with the invalid records.

T. The computer-readable storage medium as described in paragraph Q, wherein the individual fragment includes a plurality of groups, individual group having a same number of individual records and all individual records in the individual group being continuous, and the index indicates the information including at least: a first offset value of the individual record in the individual fragment; a group record count; the pre-set logical size of the individual record; a pre-set physical size of the individual record; and second offset values associated with individual groups.

What is claimed is:

1. A method comprising:
   receiving a first command to write a data stream to a storage device;
   writing the data stream into a plurality of fragments having logical addresses corresponding to physical addresses on the storage device; and
   generating an index for an individual fragment of the plurality of fragments, the index indicating information to locate the physical addresses of the individual fragment, the individual fragment including a plurality of groups, an individual group having a same number of individual records and all individual records in the individual group being continuous.

2. The method of claim 1, wherein individual records in the individual fragment have a same pre-set logical size and all individual records in the individual fragment are continuous.

3. The method of claim 2, wherein the index indicates the information including at least:
   an offset value of an individual record in the individual fragment;
   a pre-set logical size of the individual record; and
   a pre-set physical size of the individual record.

4. The method of claim 3, further comprising:
   receiving a second command to read the data stream from the storage device;
   mapping the logical addresses of the plurality of fragments into the physical addresses based at least in part on the offset value of the individual record in the individual fragment, the pre-set logical size of the individual record, and the pre-set physical size of the individual record; and
   read the data stream from the storage device according to the physical addresses of the plurality of fragments.

5. The method of claim 3, further comprising:
   receiving a third command to delete a portion of individual records from the individual fragment;
   labeling the portion of individual records as invalid records; and
   converting the index of the individual fragment to include a parameter associated with the invalid records.

6. The method of claim 5, further comprising:
   mapping the logical addresses of the plurality of fragments into the physical addresses based at least in part on the offset value of the individual record in the individual fragment, the pre-set logical size of the individual record, the pre-set physical size of the individual record, and the parameter associated with the invalid records.

7. The method of claim 1, wherein the index indicates the information including at least:
   a first offset value of an individual record in the individual fragment;
   a group record count;
   a pre-set logical size of the individual record;
   a pre-set physical size of the individual record; and
   second offset values associated with individual groups.

8. The method of claim 7, further comprising:
   mapping the logical addresses of the plurality of fragments into the physical addresses based at least in part on the first offset value of the individual record in the individual fragment, the group record count, the pre-set logical size of the individual record, the pre-set physical size of the individual record, and the second offset values associated with individual groups.

9. A system comprising:
one or more processors, and
memory communicatively coupled to the one or more processors, the memory storing computer-executable modules executable by the one or more processors that, when executed by the one or more processors, perform actions including:
receiving a first command to write a data stream to a storage device;
writing the data stream into a plurality of fragments having logical addresses corresponding to physical addresses on the storage device; and
generating an index for an individual fragment of the plurality of fragments, the index indicating information to locate the physical addresses of the individual fragment, the individual fragment including a plurality of groups, an individual group having a same number of individual records and all individual records in the individual group being continuous.

10. The system of claim 9, wherein individual records in the individual fragment have a same pre-set logical size and all individual records in the individual fragment are continuous, and the index indicates the information including at least:
an offset value of an individual record in the individual fragment;
a pre-set logical size of the individual record; and
a pre-set physical size of the individual record.

11. The system of claim 10, wherein the actions further comprises:
receiving a second command to read the data stream from the storage device;
mapping the logical addresses of the plurality of fragments into the physical addresses based at least in part on the offset value of the individual record in the individual fragment, the pre-set logical size of the individual record, and the pre-set physical size of the individual record; and
read the data stream from the storage device according to the physical addresses of the plurality of fragments.

12. The system of claim 10, wherein the actions further comprises:
receiving a third command to delete a portion of individual records from the individual fragment;
labeling the portion of individual records as invalid records; and
converting the index of the individual fragment to include a parameter associated with the invalid records.

13. The system of claim 12, wherein the actions further comprises:
mapping the logical addresses of the plurality of fragments into the physical addresses based at least in part on the offset value of the individual record in the individual fragment, the pre-set logical size of the individual record, the pre-set physical size of the individual record, and the parameter associated with the invalid records.

14. The system of claim 9, wherein the index indicates the information including at least:

a first offset value of an individual record in the individual fragment;
a group record count;
a pre-set logical size of the individual record;
a pre-set physical size of the individual record; and
second offset values associated with individual groups.

15. One or more non-transitory computer-readable storage media storing computer-readable instructions executable by one or more processors of a video compression system, that when executed by the one or more processors, cause the one or more processors to perform actions comprising:
receiving a first command to write a data stream to a storage device;
writing the data stream into a plurality of fragments having logical addresses corresponding to physical addresses on the storage device; and
generating an index for an individual fragment of the plurality of fragments, the index indicating information to locate the physical addresses of the individual fragment, the individual fragment including a plurality of groups, an individual group having a same number of individual records and all individual records in the individual group being continuous.

16. The one or more non-transitory computer-readable storage media of claim 15, wherein individual records in the individual fragment have a same pre-set logical size and all individual records in the individual fragment are continuous, and the index indicates the information including at least:
an offset value of an individual record in the individual fragment;
a pre-set logical size of the individual record; and
a pre-set physical size of the individual record.

17. The one or more non-transitory computer-readable storage media of claim 15, wherein the actions further comprises:
receiving a third command to delete a portion of individual records from the individual fragment;
labeling the portion of individual records as invalid records; and
converting the index of the individual fragment to include a parameter associated with the invalid records.

18. The one or more non-transitory computer-readable storage media of claim 15, wherein the index indicates the information including at least:
a first offset value of an individual record in the individual fragment;
a group record count;
a pre-set logical size of the individual record;
a pre-set physical size of the individual record; and
second offset values associated with individual groups.

19. The system of claim 9, wherein individual records in the individual fragment have a same pre-set logical size and all individual records in the individual fragment are continuous.

20. The one or more non-transitory computer-readable storage media of claim 15, wherein individual records in the individual fragment have a same pre-set logical size and all individual records in the individual fragment are continuous.

* * * * *